(12) United States Patent
Hurst

(10) Patent No.: US 11,556,930 B2
(45) Date of Patent: Jan. 17, 2023

(54) BIOMETRIC TRANSACTION SYSTEM

(71) Applicant: Sthaler Limited, London (GB)

(72) Inventor: Chris Hurst, London (GB)

(*) Notice: Subject to any disclaimer, the term of this patent is extended or adjusted under 35 U.S.C. 154(b) by 0 days.

(21) Appl. No.: 16/347,775

(22) PCT Filed: Nov. 10, 2017

(86) PCT No.: PCT/EP2017/078937
§ 371 (c)(1),
(2) Date: May 6, 2019

(87) PCT Pub. No.: WO2018/087317
PCT Pub. Date: May 17, 2018

(65) Prior Publication Data
US 2019/0318361 A1    Oct. 17, 2019

(30) Foreign Application Priority Data
Nov. 10, 2016    (GB) .................................... 1619025

(51) Int. Cl.
G06Q 40/00    (2012.01)
G06Q 20/40    (2012.01)
H04L 9/40    (2022.01)

(52) U.S. Cl.
CPC ... *G06Q 20/40145* (2013.01); *G06Q 20/4093* (2013.01); *H04L 63/0853* (2013.01); *H04L 63/0861* (2013.01)

(58) Field of Classification Search
CPC ................................ G06Q 40/00; G06F 21/32
USPC ......................................................... 705/44
See application file for complete search history.

(56) References Cited

U.S. PATENT DOCUMENTS

| 8,887,259 | B1 | 11/2014 | Harding |
| 9,418,214 | B1* | 8/2016 | Harding .............. G06F 21/6254 |
| 2007/0175986 | A1 | 8/2007 | Petrone |
| 2007/0284432 | A1 | 12/2007 | Abouyounes |
| 2010/0039223 | A1 | 2/2010 | Siedlarz |

(Continued)

FOREIGN PATENT DOCUMENTS

| EP | 3539073 A1 | 9/2019 |
| GB | 2465782 | 6/2010 |
| WO | 201305101 | 4/2013 |

(Continued)

OTHER PUBLICATIONS

Anonymous: "Tokenization (data security)—Wikipedia", Sep. 29, 2016, XP055813109, Retrieved from the Internet: URL:https://en.wikipedia.org/w/index.php?title=Tokenization_(data_security)&oldid=741741846 [retrieved on Jun. 11, 2021].

(Continued)

*Primary Examiner* — Ojo O Oyebisi
(74) *Attorney, Agent, or Firm* — Conley Rose, P.C.

(57) ABSTRACT

Disclosed is a system for enrolling a user for facilitation of transactions using biometric authentication. The enrolling system includes an application program that is configured to: receive a user attribute; create an anonymous client reference (ACR) associated with the user attribute; and receive a biometric template. The biometric template has been determined from an input of a biometric. The enrolling system is further configured to create an association between the biometric template and the ACR.

21 Claims, 6 Drawing Sheets

(56) References Cited

U.S. PATENT DOCUMENTS

2016/0217277 A1     7/2016   Johnston
2017/0046714 A1*   2/2017   Van de Velde ......... G06F 21/34

FOREIGN PATENT DOCUMENTS

| WO | 2016019679 | 2/2016 |
| WO | 2016118304 | 7/2016 |
| WO | 2016118304 A1 | 7/2016 |

OTHER PUBLICATIONS

EP Examination Report dated Jun. 17, 2021, for Patent Application No. EP 17801409.8.
UK Examination Report dated Jul. 12, 2021, for Patent Application No. GB1619025.8.
International Search Report and Written Opinion for PCT/EP2017/078937 dated Feb. 5, 2018 (13 pages).
English Abstract of 2016019679.

* cited by examiner

BIOMETRIC TRANSACTION SYSTEM

CROSS REFERENCE TO RELATED APPLICATIONS

This application is the U.S. National Stage entry under 35 U.S.C. § 371 of International Patent Application No. PCT/EP2017/078937, filed Nov. 10, 2017, and entitled "Biometric Transaction System," which claims priority to GB Application No. 1619025.8 on Nov. 10, 2016, entitled "Biometric Transaction System", all of which are incorporated by reference herein in their entireties for all purposes.

STATEMENT REGARDING FEDERALLY SPONSORED RESEARCH OR DEVELOPMENT

Not applicable.

BACKGROUND

The present invention relates to systems and methods for using biometrics to facilitate transactions.

There are a variety of cash-free transaction systems available that use payment card companies to facilitate a payment by electronic funds transfer. These systems traditionally use payment cards, such as chip and PIN and radio frequency identification (RFID) contactless cards, but the use of RFID with devices such as smartphones is becoming more common. Chip and PIN payments involve two-factor authentication, presenting the card and entering the PIN, as do device RFID payments, such as Apple Pay which requires the presentation of the device and a biometric or passcode. Contactless payments use single-factor authentication: presentation of the card.

Other cash-free transaction systems do not involve payment card companies or banks, but instead use credit or tickets that are pre-loaded onto contactless smart cards using single-factor authentication. An example of this would be smart cards for public transport, such as Transport for London's Oyster card. However, the use of single-factor authentication is commonly seen as vulnerable to fraud. For example, the contactless function of a stolen chip and PIN card can be used multiple times before a transaction requires the use of the chip and PIN function, and a stolen smart card has unlimited use, or can be used until the pre-loaded credit runs out.

For single-factor contactless payment card transactions, a chip in the card transmits the account details to the contactless card reader. The card reader then transmits the account details to the payment card company for verification and to authorise the transaction. Due to the lack of identity verification and single-factor authentication, there is often an upper limit on the value of contactless transactions and the number of consecutive contactless transactions in order to limit the impact of fraudulent transactions. Contactless payments cards have no intrinsic system for removing the possibility of fraudulent use.

Chip and PIN and contactless payment card transactions provide further opportunities for fraud in the authentication process. This is due to the exchange of card details between the entities involved, including from the card to the card reader and then onwards to the payment card company. There are thus opportunities to steal payment card information which can then be used if the encryption is broken, or if the information was stolen unencrypted.

The convenience of card payment services has led to a diminished need to carry around cash. This has been reinforced by the ease of contactless transactions. Removing the need to carry cards around would further improve the convenience of performing transactions. Biometric-only authentication is advantageous as it does not require a device or card at point of sale or payment. Biometric identifiers can be used for authentication purposes due to the uniqueness of human physical characteristics such as fingerprints, facial features and vascular patterns. Biometrics can be used alone for single-factor authentication, or alongside other factors for a multiple-factor authentication system. Biometrics have previously been used for authentication in controlling access to ATM machines and online bank accounts, but only using multiple-factor authorisation, for example also requiring the presentation of a card or a code. There is therefore a need for a secure single-factor biometric transaction system suitable for use with banks and card payment services, and which removes the possibility for stealing payment card information.

GB-A-2,465,782 discloses a method and apparatus for providing biometric authentication of a user. A registration process is used in which a reference data sample representative of a biometric attribute of a reference user is used to train a statistical classifier such as a neural network to achieve a target output. The set of parameters of the statistical classifier, e.g. the weights that achieve this in the neural network, are stored on a user's device as a first data set. For subsequent authentication of a user to be tested at an access point, the first data set is retrieved from the user device and a second data set representative of the biometric attribute of the test user is generated directly from the test user. Typically, the biometric information is used is a voice print of a user.

WO-A-2016/019679 discloses biometric authentication using a finger vein recognition system. An imaging circuit, an illumination circuit, a recognition module and a wireless transmission module are used. The imaging circuit includes a CCD camera, an optical lens and an optical filter; the illumination circuit consists of near-infrared LEDs. The wireless transmission module transmits video information and a control signal to a computer so as to realize communication with the computer and enable authentication.

US-A-2016/217277 discloses apparatus for enrollment and verification of a user comprising one touch two factor biometric sensors. An enrollment process creates a baseline abstract identity information for the user. Subsequent verification processes capture new abstract identity information to be matched to the baseline on an encrypted server. A first camera takes a first surface image of a portion of a user's finger to capture the pattern of friction ridges and valleys and intersection points. A second camera takes a second subsurface image of a vein map below the surface of the user's finger. These are then fused into a binary format that cannot be reversed to reacquire either the fingerprint or the vein map.

SUMMARY OF DISCLOSURE

According to a first aspect of the present disclosure, there is provided a system for enrolling a user for facilitation of transactions using biometric authentication, wherein the system comprises an application program configured to: receive a user attribute; create an anonymous client reference (ACR) associated with the user attribute; receive a biometric template, wherein the biometric template has been determined from an input of a biometric; and create an association between the biometric template and the ACR.

An anonymous client reference is used in conjunction with a user attribute and a biometric template. Both the user attribute and the biometric template are associated with the ACR which enables the ACR to be used in subsequent transactions and interactions without ever directly linking the biometric template and the user attribute. A significant level of security is thus provided.

According to a second aspect of the present disclosure, there is provided a system for facilitating transactions using biometric authentication, wherein the system comprises an application program configured to: receive a biometric template, wherein the biometric template has been determined from an input of a biometric; retrieve an ACR associated with the biometric template; and bind the biometric template to the ACR.

In an embodiment, the application program is further configured to communicate with a payment card company.

In an embodiment, the application program is further configured to receive a tokenised representation of a payment card from the payment card company.

In an embodiment, the application program is further configured to create an association between the biometric template and the tokenised representation of a payment card and bind the biometric template to the tokenised representation of a payment card.

In an embodiment, the application program is further configured to receive a tokenised asset, wherein the tokenised asset is a tokenised representation of any of: a ticket, a voucher, a pass, and an identity card.

In an embodiment, the application program is further configured to create an association between the biometric template and the tokenised asset and bind the biometric template to the tokenised asset.

In an embodiment, the user attribute is any of: date of birth, organisation membership, scheme membership, voucher, ticket, loyalty card.

In an embodiment, the system further comprises a database configured to store the ACR.

In an embodiment, the biometric template is determined by a biometric input device.

In an embodiment, the system further comprises a server configured to receive the biometric template and transmit the biometric template to the application program.

In an embodiment, the server further comprises a database configured to store the biometric template.

In an embodiment, after receiving the biometric template, the server is configured to compare the biometric template against previously stored biometric templates in the database in order to find a match.

In an embodiment, the database is divided into subsets of previously stored biometric templates according to location of biometric template determination.

In an embodiment, the server transmits the biometric template to the application program only if a match has been found among the stored biometric templates in the database.

In an embodiment, the system further comprises a biometric input device configured to determine the biometric template and transmit the biometric template to the server.

In an embodiment, the biometric input device is configured to encrypt the biometric template for transmission.

In an embodiment, the biometric input device is a finger vein reader.

In an embodiment, the biometric is a vascular pattern in a finger.

In an embodiment, the biometric is one of: fingerprint, iris pattern, retina, facial features, voice, gait, odour, hand geometry, finger geometry, vascular pattern, ear shape, DNA.

In an embodiment, the system further comprises a computing device, wherein the computing device is configured to communicate with the application program; and wherein the computing device comprises a user interface.

In an embodiment, the application program is a cloud-based application.

According to a third aspect of the present disclosure, there is provided a system for facilitating transactions using biometric authentication, the system comprising: a biometric input device configured to determine a first biometric template from a first biometric input; a server comprising a database and RAM, wherein the server is configured to receive the first biometric template from the biometric input device and the database is configured to store the first biometric template; an application program configured to receive a user attribute and a tokenised asset, create an ACR associated with the user attribute, receive the first biometric template from the server, and create associations between all of the first biometric template, the ACR, and the tokenised asset.

The use of an ACR, i.e. an identifier that is unique to each user, increases the security of the system by separating the user from their biometric template. A user also cannot be identified from an ACR alone.

In an embodiment, the biometric input device is further configured to determine a second biometric template from a second biometric input; and wherein the server is further configured to receive the second biometric template from the biometric input device and find a match in the RAM between the first biometric template and the second biometric template.

In an embodiment, the application program is further configured to bind the first biometric template, the ACR and the tokenised asset to each other.

In an embodiment, the tokenised asset is a tokenised representation of any of: a ticket, a voucher, a pass, and an identity card.

In an embodiment, the application program is further configured to communicate with a payment card company.

In an embodiment, the application program is further configured to receive a tokenised representation of a payment card from the payment card company.

In an embodiment, the application program is further configured to create an association between the first biometric template and the tokenised representation of a payment card and bind the first biometric template to the tokenised representation of a payment card.

In an embodiment, the user attribute is any of: date of birth, organisation membership, scheme membership, voucher, ticket, loyalty card.

In an embodiment, the server transmits the first biometric template to the application program if a match has been found between the first biometric template and the second biometric template.

In an embodiment, the biometric input device is configured to encrypt the first and second biometric templates before transmitting them to the server.

In an embodiment, the biometric input device is a finger vein reader.

In an embodiment, the biometric is a vascular pattern in a finger.

In an embodiment, the biometric is one of: fingerprint, iris pattern, retina, facial features, voice, gait, odour, hand geometry, finger geometry, vascular pattern, ear shape, DNA.

In an embodiment, the system further comprises a computing device, wherein the computing device is configured to communicate with the biometric input device and the application program; and wherein the computing device comprises a user interface.

In an embodiment, the application program is a cloud-based application.

In an embodiment, the database is divided into subsets of previously stored biometric templates according to location of biometric template determination.

According to a fourth aspect of the present disclosure, there is provided a method of enrolling a user for facilitation of transactions using biometric authentication, the method comprising: creating an ACR for the user; receiving a biometric template, wherein the biometric template has been determined from an input of a biometric provided by the user; associating the biometric template with the ACR; and storing the biometric template and ACR in separate databases, thereby allowing the retrieval of the ACR by provision of the associated biometric template.

In an embodiment, the method further comprises: requesting a tokenised representation of the payment card from a payment card company; receiving the tokenised representation of the payment card from the payment card company; creating associations between the tokenised representation of the payment card, the ACR and the biometric template.

In an embodiment, the method further comprises receiving a user attribute; associating the user attribute with the ACR; wherein the user attribute is any of: date of birth, organisation membership, scheme membership, voucher, ticket, loyalty card.

In an embodiment, the method further comprises transmitting the biometric template to a server before storing the biometric template in the database.

According to a fifth aspect of the present disclosure, there is provided a method of facilitating transactions using biometric authentication, the method comprising: receiving a biometric template, wherein the biometric template has been determined from an input of a biometric provided by a user; binding the biometric template to an associated ACR, wherein the ACR is associated with a user attribute, thereby allowing the user to access the attribute.

In an embodiment, the method further comprises comparing the biometric template against previously stored biometric templates in order to find a match.

In an embodiment, the method further comprises: requesting a tokenised representation of a payment card from a payment card company; receiving the tokenised representation of the payment card from the payment card company; binding the tokenised representation of the payment card to the ACR and biometric template.

In an embodiment, the method further comprises receiving a tokenised asset; associating the tokenised asset with the ACR; wherein the tokenised asset is any of: a ticket, a voucher, a pass, and an identity card.

In an embodiment, receiving a biometric template comprises an application program receiving the biometric template transmitted by a server.

In an embodiment, binding the biometric template to an associated ACR is carried out by the application program.

In an embodiment, receiving a biometric template comprises a server receiving the biometric template transmitted by a biometric input device.

In an embodiment, the biometric input device is a finger vein reader.

In an embodiment, the biometric is a vascular pattern in a finger.

In an embodiment, the biometric is one of: fingerprint, iris pattern, retina, facial features, voice, gait, odour, hand geometry, finger geometry, vascular pattern, ear shape, DNA.

BRIEF DESCRIPTION OF THE DRAWINGS

Exemplary embodiments of the present disclosure will now be described in detail with reference to the accompanying drawings, in which.

Figure 1:
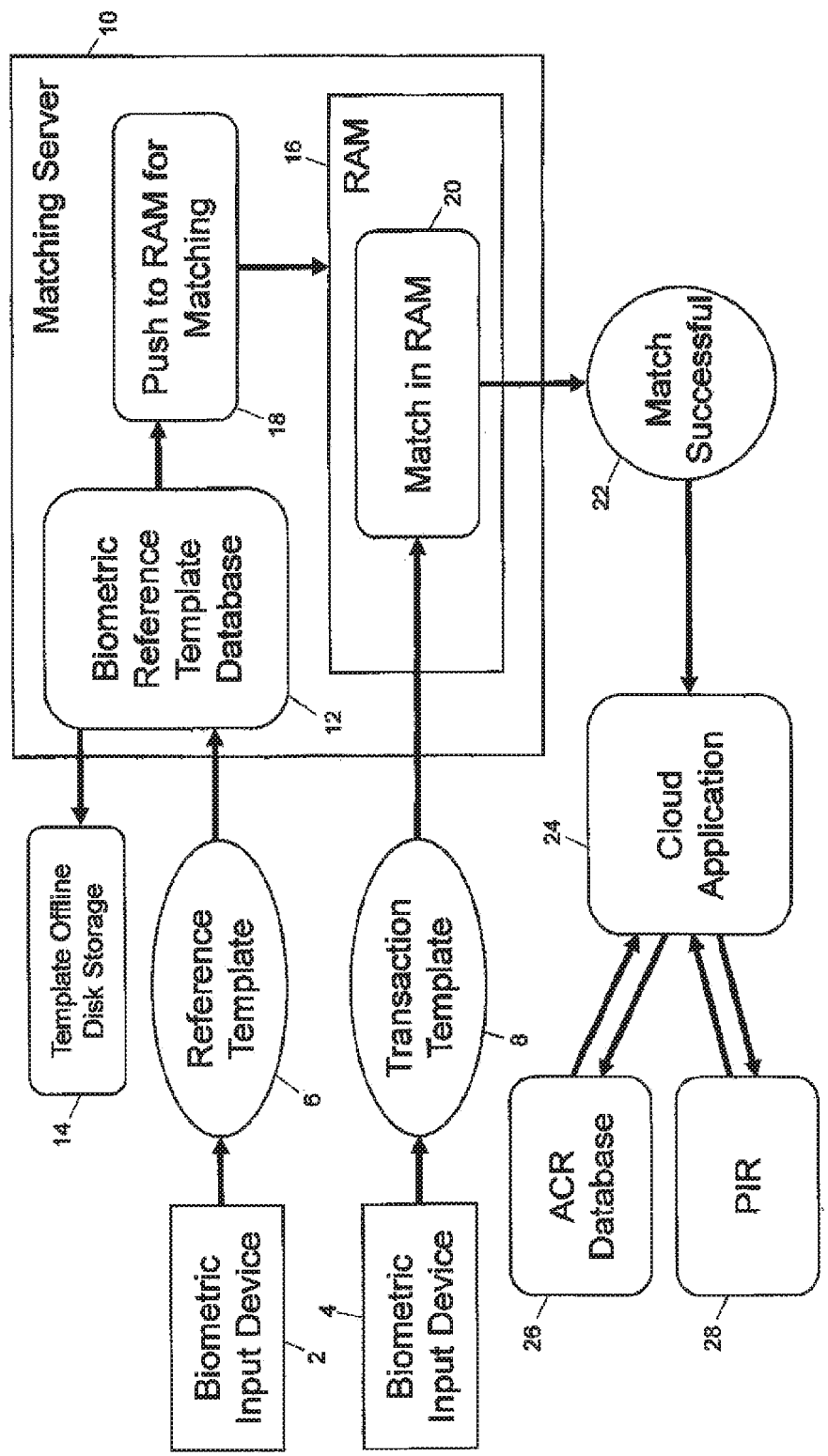
FIG. 1 is a schematic representation of a biometric transaction system in accordance with an embodiment of the present disclosure.

DETAILED DESCRIPTION OF THE
DISCLOSED EXEMPLARY EMBODIMENTS

Generally, the biometric transaction system of the present disclosure comprises enrolling onto the system by associating a user's biometric template with their anonymous client reference (ACR), which has one or more user attributes associated with it. The biometric template is a digital representation of distinct characteristics of a biometric identifier and is obtained from a user's biometric by a biometric input device. The template can, for example, be a digital file extracted from an image of a biometric. The template could be an encoded version of the image, the image itself in some appropriate format or indeed some selected values from the image used to create the template.

The user uses the system to carry out a transaction by providing their previously enrolled biometric to the input device. A template can then be extracted from the provided biometric and if a matching biometric template is found stored in the system, the previously associated ACR and biometric template are bound and the transaction continues through access to the user attributes or an associated tokenised asset, such as a payment card.

The biometric transaction system provides the capability of carrying out transactions securely, quickly and efficiently. The system separates the merchant from the payment card company and reduces the possibility of card details being intercepted, such as from a card reader. The personal data dealt with by the merchant are anonymised, encrypted biometric templates, from which it is impossible to recreate the raw biometric data. So, if the biometric templates were to be intercepted and unencrypted during transmission from the biometric input device to the rest of the biometric transaction system, the data would be useless. The users of the biometric transaction system are therefore heavily protected from fraud and theft.

The biometric transaction system further protects against theft and identity fraud by only maintaining anonymous data. For example, in embodiments the biometric templates, ACRs and tokenised assets are only bound to each other during a transaction, and the biometric templates and tokenised assets are only associated to users of the system anonymously, through the ACRs.

In examples, the biometric transaction system is used to authenticate a wide variety of activities, including financial transactions and claims relating to identity, such as age, or to authenticate ownership of assets such as vouchers, travel tickets and event tickets. A technical solution to the problem of secure authentication is thus provided, enabling transactions to be safely and efficiently carried out. Non-limiting examples of use of the biometric transaction system include: paying in restaurants, shops and bars; gaining entry to concerts and festivals; and paying for buses, trains and taxis.

Biometrics include a wide range of measurements of human characteristics, such as fingerprints, finger or hand vascular patterns, retinal vascular patterns, iris features, facial features, finger or hand geometry, gait, odour, DNA, ear shape and voice patterns. Embodiments of a biometric transaction system are configurable for use with any type of biometric; however a preferred embodiment is configured for use with finger vascular patterns. These provide the advantage that as an internal biometric they are very difficult to acquire without the cooperation of the owner.

Finger vascular patterns are one of the most secure types of biometric available. Unlike many biometrics, such as fingerprints and gait, it is difficult to obtain finger vascular patterns at a distance or without the cooperation of the owner. In the preferred embodiment, a user's finger vascular pattern is obtained by a finger vein reader such as the Hitachi H1 Finger Vein Reader. Finger vein readers require a flow of blood through the vessels in a finger and so the biometric cannot be stolen and used to authenticate a transaction. There is thus no need for limits on the value and number of biometric transactions.

An example of such a finger vein reader is described in detail in EP-A-2,138,954. A finger vein authentication device is provided including a finger information register unit for extracting information of a vein pattern from a vein image and registering the information as a matching template in a memory. A finger vein authentication unit for extracting information of a vein pattern from the vein image, determining a template from it and matching it with a previously stored template is provided to perform personal authentication.

The device includes a finger image processing unit for extracting characteristics data of the finger from the vein image and a finger placement state determining unit for determining whether a placement state of the finger is good or not according to whether the characteristics data of the finger is within a predetermined range or not. If the determination result of the finger placement state determining unit is not good, the user is instructed to correctly place the finger by a picture output unit and/or a voice output unit, and the vein image is obtained again.

Different biometrics used in other embodiments may be obtained by other suitable biometric input devices. In one embodiment, the system requires one biometric input; in other embodiments, multiple biometric inputs are required. Examples of using multiple biometrics inputs are finger vascular patterns obtained from more than one finger, or a combination of a finger vascular pattern and a different type of biometric, such as a fingerprint.

In one embodiment, in order to begin using the biometric transaction system, a user first enrolls into the system. Enrollment involves the user providing a biometric to the biometric input device for the determination of a reference biometric template. The biometric input is converted into a biometric template by extracting characterising features of the biometric. The reference biometric template is stored by the system so that it can be retrieved at a later date for the authentication of a transaction. Enrollment also involves the biometric transaction system creating an anonymous client reference (ACR) and associating it with the reference biometric template. The ACR can be created before or after input of the biometric.

An ACR is an identifier that is unique to each user and increases the security of the system by separating the user from their biometric template. A user also cannot be identified from an ACR alone. The biometric transaction system associates the ACR with one or more user attributes. In embodiments, a user attribute can be something that the user is, such as an identity credential, or that the user owns, such as a non-monetary asset. Further examples of user attributes are date of birth, vouchers, organisation/scheme membership, loyalty card and purchase history. In one example, a user attribute is the successful enrollment of the user onto the biometric transaction system.

In embodiments, enrollment also involves registering the user's personal details, such as name, address, phone number, email address. These details are associated with the ACR as user attributes, or held separately for security. Any suitable user attribute could be provided and used during enrollment (for association with the ACR).

In embodiments, a further step in enrollment is to associate the ACR and reference biometric template with tokenised assets which the user may exchange in a transaction. These assets are tokenised for security. Examples of tokenised assets are representations of travel or entry tickets, vouchers, passes, and identity cards. As well as, or instead of, tokenised assets, the ACR and reference biometric template are associated with a payment instrument reference (PIR). A PIR is a tokenised representation of a payment card; in embodiments this is a tokenised primary account number (PAN). The biometric transaction system communicates with a payment card company to request and subsequently receive a PIR. The biometric transaction system associates the PIR with the ACR and biometric template. More than one PIR is able to be associated to each ACR. In embodiments, tokenised assets may be provided by other companies.

In embodiments the tokenised assets are presented, in the context of an interaction, to the identified user. The user is able to select a default tokenised asset for an interaction, e.g. a Credit Card for Payment at point-of-sale. The user is able to select from a group of presented tokenised assets appropriate for an interaction. In one example the group of available tokenised assets may include an alternative Credit Card, Event Ticket, Coupon or a claim of identity. In embodiments the options are presented after biometric identification has been performed.

In embodiments, no personally identifiable information is transmitted or received at the point-of-transaction, and so the efficiency, security and speed of counterparty identification is improved and transaction risk reduction is reduced. In embodiments the presence of and group of digital tokenised assets, including those from other companies and organisations including governments, are associated with or bound to an ACR, and presented in context as a strong claim to relying parties.

Once a user has successfully enrolled, they may use the biometric transaction system to carry out a transaction such as paying for goods in a shop, or presenting a ticket for entry to an event. For the user to gain access to their tokenised assets, the transaction is biometrically authenticated. The user provides their enrolled biometric to the biometric input device for the determination of a transaction biometric template. The transaction biometric template is compared to the reference biometric templates gathered from all or some of the users enrolled into the biometric transaction system to find a match. A match between biometric templates occurs only for biometric templates generated from exactly the same biometric. Once a matching reference biometric template has been found, the reference biometric template is bound to the ACR and to tokenised assets that were associated with the reference biometric template at enrollment. The transaction has now been authenticated with the user's biometric and the transaction is ready to be authorised and settled by the payment card company, or other holder of a commodity to which a tokenised asset corresponds.

Some of the functions of the biometric transaction system are carried out by an authentication application program which is, in embodiments, cloud-based. The authentication application communicates and exchanges PIRs with payment card companies. Keeping this exchange cloud-based distances personal information from the merchant to provide higher protection against fraud, when compared to traditional card payments. In embodiments, the authentication application connects to a database in which the authentication application stores the ACRs after creating them. The reference biometric templates are stored in a separate database, which, in embodiments, is located on a server connected to the authentication application. The server is also connected to the biometric input device, which encrypts the biometric templates that it determines and transmits the encrypted biometric templates to the server. The server receives the encrypted reference biometric templates and transmits them to the authentication application for association to the ACRs, tokenised assets and PIRs, and stores the encrypted reference biometric templates in a database for later comparison against transaction biometric templates.

For the matching process, the server receives the encrypted transaction biometric templates and compares them in the RAM to the encrypted reference biometric templates to find a match. Once a match has been found, or all of the reference biometric templates have been tested and no match has been found, the server discards the transaction biometric template. If a match has been found, the server transmits the reference biometric template to the authentication application. The authentication application retrieves the associated ACR, tokenised assets and PIRs and binds them together and to the reference biometric template.

In embodiments, the authentication application is also connected to a computing device with a user interface, such as a PC, tablet computer, smartphone, or point-of-sale (POS) terminal. In various embodiments, the computing device is also connected to the biometric input device and provides capabilities to the user for enrollment, such as registering personal details, contact details, user attributes and/or a payment card to be tokenised, and for transactions, such confirming user attributes or selecting a tokenised asset or payment card to use. The computing device is also able to provide capabilities to a vendor with whom the user is carrying out a transaction, such as inputting a monetary value for settlement with a payment card company.

In embodiments, the enrollment of a user onto the biometric transaction system is carried out at an enrollment station and a transaction between a user and a vendor that is authenticated using the biometric transaction system is carried out at a transaction station. Both the enrollment station and the transaction station are equipped with a biometric input device and computing device, and are connected to a server and authentication application. In some embodiments, a transaction station may also be an enrollment station, and an enrollment station may also be a transaction station.

Referring now to FIG. 1, in an embodiment of enrollment onto the biometric transaction system, a biometric input device 2 receives a biometric input from a user and acquires a biometric sample. The sample may be a still image, video recording, or audio recording, depending on the type of biometric input. From this sample, the biometric input device extracts characterising features and determines a reference biometric template. The reference biometric template is then encrypted for transmission to a matching server 10. The reference biometric template 6 is received by the matching server 10 and stored in a database 12, as well as offline in disk storage 14. The reference biometric template 6 is also associated with a newly created ACR in the cloud-based authentication application 24 and a payment instrument reference PIR 28 supplied by a payment card company at the prompting of a user. The cloud application 24 stores ACRs in a database 26 which, in combination with other features described herein, represents a new system.

In the embodiment, the matching of the biometric template is made in the Cloud (matching server 10). The meta-data created during the enrollment process is subsequently used to establish the optimal matching speed of presented biometric templates offered for match. The matching of a scanned biometric template is therefor made against all other reference biometric templates, with speed and accuracy assured.

When the enrolled user subsequently inputs the same biometric to a biometric input device 4 in order to authenticate a transaction, another biometric sample is taken and a corresponding transaction biometric template 8 is determined. This transaction biometric template 8 will be compared against reference biometric templates 6 in the database 12 in order to find a match.

The transaction biometric template 8 is encrypted and transmitted to the random access memory (RAM) in the matching server 10. The reference biometric templates 6 that are stored in the reference biometric template database 12 are also pushed to the RAM 16 so that the reference biometric templates 6 can be searched to find one that matches the transaction biometric template 8.

The time taken for a matching reference biometric template 6 to be found depends on the number of reference biometric templates 6 that have to be tested for a match. In one embodiment, a shorter matching time is obtained by reducing the number of templates to be tested. This is achieved by splitting or segmenting the reference biometric templates 6 in the database 12 into subsets according to associated characteristics, such as location and user behaviour, as will be explained in more detail below. In an embodiment, the reference biometric template 6 stored in the database 12 is associated with information relating to the location at which the user enrolled onto the system.

For example, the database entries could be segmented by areas of enrollment; such areas could be cities, counties, countries and/or continents. If a user inputs their biometric to make a transaction in a particular first area, London for instance, the first subset of reference biometric templates 6 to be searched will be the subset of reference biometric templates 6 from users who enrolled in that first area. If no match is found, the next subset to be tested would be the reference biometric templates 6 from users who enrolled in a larger second area containing the smaller first area, but excluding those reference biometric templates 6 in the first subset that have already been tested. Continuing the example of London as the first area, the second area may be southern England or the UK and the subset to be tested would include all of the reference biometric templates 6 from users who were enrolled in the second area but not in London. By starting with a small areas and gradually increasing the area sizes until a match is found, the matching time is minimised. Thus an advantage is achieved in that the database searches and time taken to process a search and find a match of templates is minimised or reduced.

An example of narrowing the reference biometric template database 12 according to user behavioural patterns involves updating the reference biometric template 6 at every match with the locations of the transactions being carried out. Subsets of reference biometric templates 6 can then be constructed for users who are frequent customers at a particular businesses or chains of businesses. For a transaction being carried out at a particular business, the subset of templates 6 for frequent customers of that business would be searched first to find a reference biometric template 6 that matched the transaction biometric template 8. If no match is found, the next subset to be searched may be the reference biometric templates 6 for frequent customers of similar or nearby businesses.

Once a successful match 22 has been found between the transaction biometric template 8 and a reference biometric template 6, the reference biometric template 6 is transmitted to the cloud application 24. The cloud application 24 binds the reference biometric template 6 with its associated ACR taken from the ACR database 26. The cloud application 24 also binds the reference biometric template 6 and ACR to their associated PIR 28.

To enroll onto the biometric transaction system, a user registers their biometric and one or more user attributes. Attributes include date of birth, vouchers, organisation/scheme membership, and loyalty card. In embodiments, the user also registers a payment card in order to use the biometric transaction system for authentication of financial transactions. The user can register multiple versions of a biometric, for example finger vascular patterns or fingerprints of multiple fingers on both hands. This provides more convenience to the user as it does not matter which hand or finger is used to carry out the transaction. This is advantageous when a hand or finger is temporarily unavailable, for example one hand may be injured or holding something.

Figure 2:
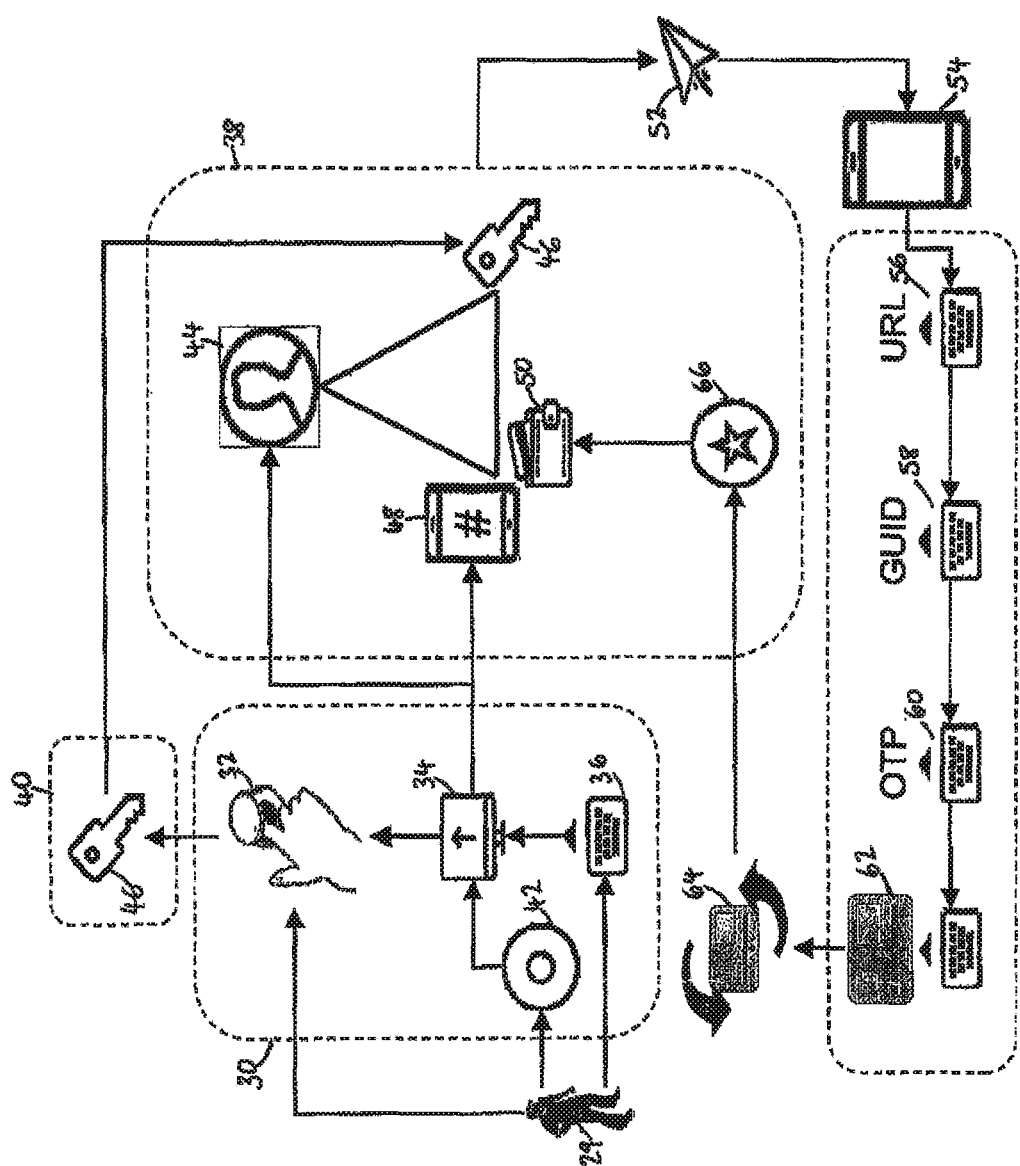
FIG. 2 is a schematic representation of a first method and system for enrolling a user onto a biometric transaction system in accordance with an embodiment of the present disclosure.

Referring to FIG. 2, in one embodiment enrollment is initiated in-store at an enrollment station 30. The enrollment station 30 is equipped with a biometric input device 32 and a computing device 34 with a user interface 36. The computing device may be any one or more of a POS terminal, PC, tablet computer or smartphone. The device 34 is in communication with the biometric input device 32 and a network including the authentication application 38 and matching server 40. The computing device 34 may be operated by the primary user 29 to be enrolled onto the biometric transaction system and/or an operator of the enrollment station, for example a vendor employee. In some embodiments the enrollment station 30 is dedicated to enrollment and does not perform transactions. In other embodiments the enrollment station 30 also serves as a transaction station.

In an embodiment of in-store enrollment, the user 29 or vendor employee presses the enroll button 42 on the device to anonymously enroll the user 29. The enroll button 42 could be a physical piece of hardware as part of a physical interface, i.e. an actual button, or it could be part of a GUI on a touch screen device.

This anonymous enrollment is subsequently available for personalisation by the user registering their details. Pressing the enroll button 42 prompts the authentication application 38 to create an ACR 44. The user 29 provides their biometric to the biometric input device 32. The biometric input device 32 takes a biometric sample and determines the reference biometric template 46 for matching purposes. The reference biometric template 46 is encrypted and transmitted to the matching server 40 for storage in the database and also transmitted to the authentication application 38 for association with the ACR 44. The user 29 also uses the user interface 36 of the computing device 34 to input a mobile phone number 48, which is associated with the ACR 44 and encrypted reference biometric template 46. The authentication application 38 additionally generates a values wallet 50 and associates it with the ACR 44 and reference biometric template 46. The values wallet 50 is where any tokenised assets and PIRs are held. The ACR 44 is stored by the authentication application 38 in an ACR database.

The authentication application 38 uses the provided mobile phone number 48 to send an SMS 52 to the user's mobile phone 54. The SMS 52 contains a uniform resource locator (URL) 56, globally unique identifier (GUID) 58 and a one-time password (OTP) 60, which allow the user to use their phone 54 to access a webpage and log in to an account associated with their phone number 48, ACR 44, reference biometric template 46 and values wallet 50. The user 29 can then personalise the anonymous enrollment by registering their details with the authentication application 38 to create a user profile and account. Alternatively, the authentication application sends the user a link to a mobile application which can be downloaded to their phone. The registration can then be completed using the mobile application.

In another embodiment, the user 29 inputs an email address into the computing device 34, as well as a mobile phone number 48. The authentication application 38 uses the provided email address to send an email to the user 29 with the URL 52 and GUID 58. The user 29 retrieves the email on a mobile phone 54, tablet or PC in order to follow the URL to complete enrollment. The OTP 60 is sent via SMS to the mobile phone 54.

The user 29 also registers information for one or more payment cards 62. Payment card registration can be achieved through the manual entering of the card details, or using technology such as card.io within a mobile application to gain the card details by using the phone 54 to take a picture of the card 62. When the user 29 submits their card details, the payment card company 64 is contacted for validation of the card details and to obtain a PIR 66. The payment card company 64 transmits the PIR 66 to the authentication application 38, associates the PIR 66 with the ACR and reference biometric template, and stores the PIR 66 in the values wallet 50. At this point, the user 29 is enrolled onto the biometric transaction system and is ready to use the biometric transaction system to facilitate a transaction.

Figure 3:
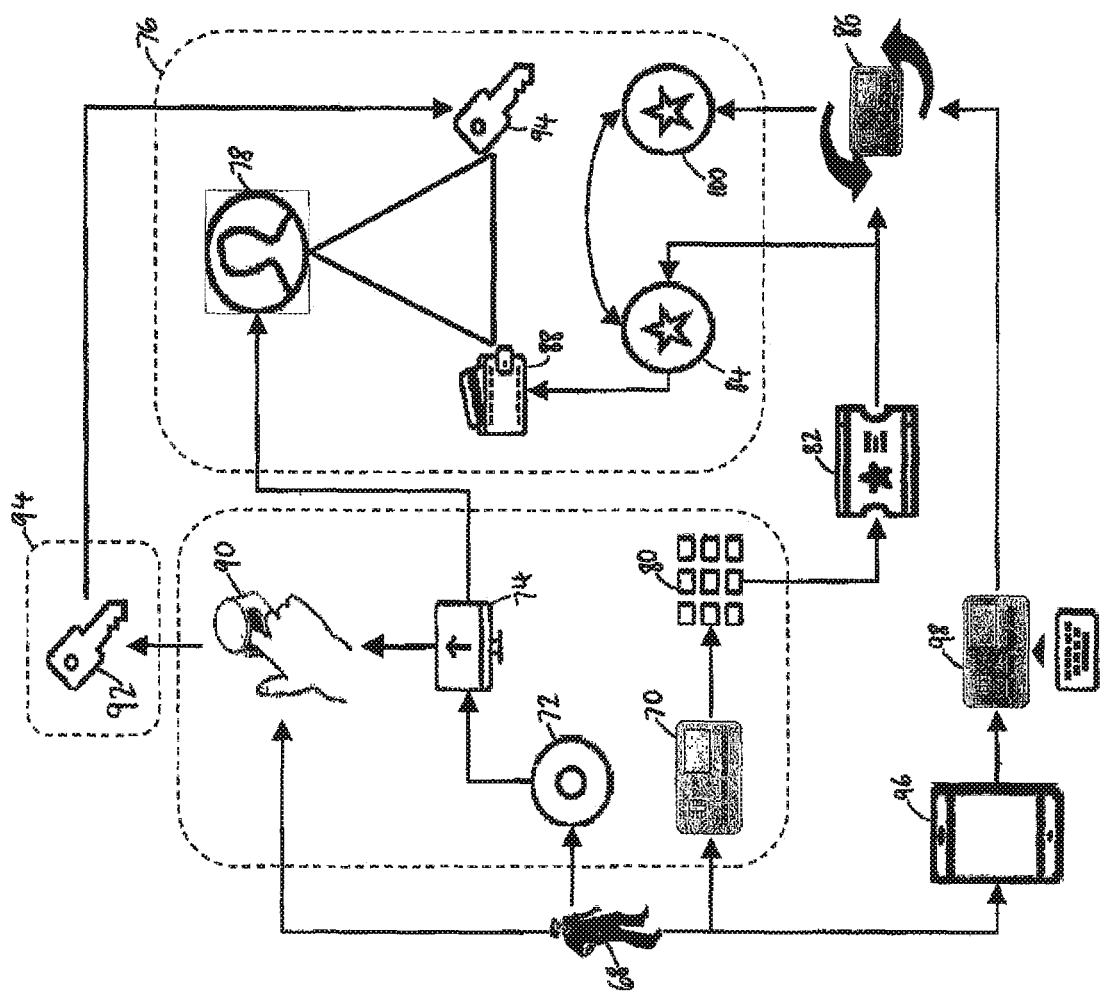
FIG. 3 is a schematic representation of a second method and system for enrolling a user onto a biometric transaction system in accordance with an embodiment of the present disclosure.

Referring to FIG. 3, in another embodiment of in-store enrollment, a user 68 is required to register their chip and PIN payment card 70 when they enroll. This allows use of the biometric transaction authorisation system for a card payment during or immediately following enrollment. The user 68 elects to enroll onto the biometric transaction system in-store by pressing an enroll button 72 at a POS terminal 74 connected to the authorisation application 76. Again, the button 72 could be an actual button or representation of a button or selection on a GUI such as might be provided on a touch screen device. This action is alternatively carried out by a biometric transaction system operator such as a vendor employee. This prompts the authentication application 76 to create an ACR 78 and wait for the user 68 to complete a transaction 82 on a PIN entry device 80 that has been pre-registered with the biometric transaction system. The transaction 82 for enrollment requires verification and authentication of the payment card 70 and authorisation of the transaction 82 by the card payment company 86. The transaction 82 may or may not include a payment. A successful chip and PIN transaction 82 results in a PIR 84 supplied to the authentication application 76 by the payment card company 86. The PIR 84 is held in the values wallet 88 and associated with the ACR 78.

The user 68 also provides their biometric to a biometric input device 90 to create a reference biometric template 92. This can be done before or after the chip and PIN transaction. The reference biometric template 92 is encrypted and transmitted to the matching server 94 for storage in the database and also transmitted to the authentication application 76 for association with the ACR 78 and PIR 84.

The user 68 is now ready to complete anonymous biometric transactions, but the user 68 can also build a personal profile if desired. This requires initial identification to access the ACR 78 associated to the user's previously enrolled payment card 70. The user 68 inputs their payment card details to a webpage or mobile application. This can be carried out using a phone, tablet computer, PC, or other device capable of connecting to the card payment company 86 and the authentication application 76. The card details can be entered manually using a keyboard, or through technology such as card.io, which obtains the card details through image processing. The card details are validated by the card payment company 86, which then provides the authentication application 76 with a second PIR 100 for the card 70. The second PIR 100 is compared against the PIRs held by the authentication application 76 to find a matching PIR 84. Once a matching PIR 84 and the associated ACR 78 have been found, the user 68 is able to build their personal profile to be associated with the ACR 78. The personal profile may include user attributes that can be accessed through a transaction facilitated by the biometric transaction system.

Figure 4:
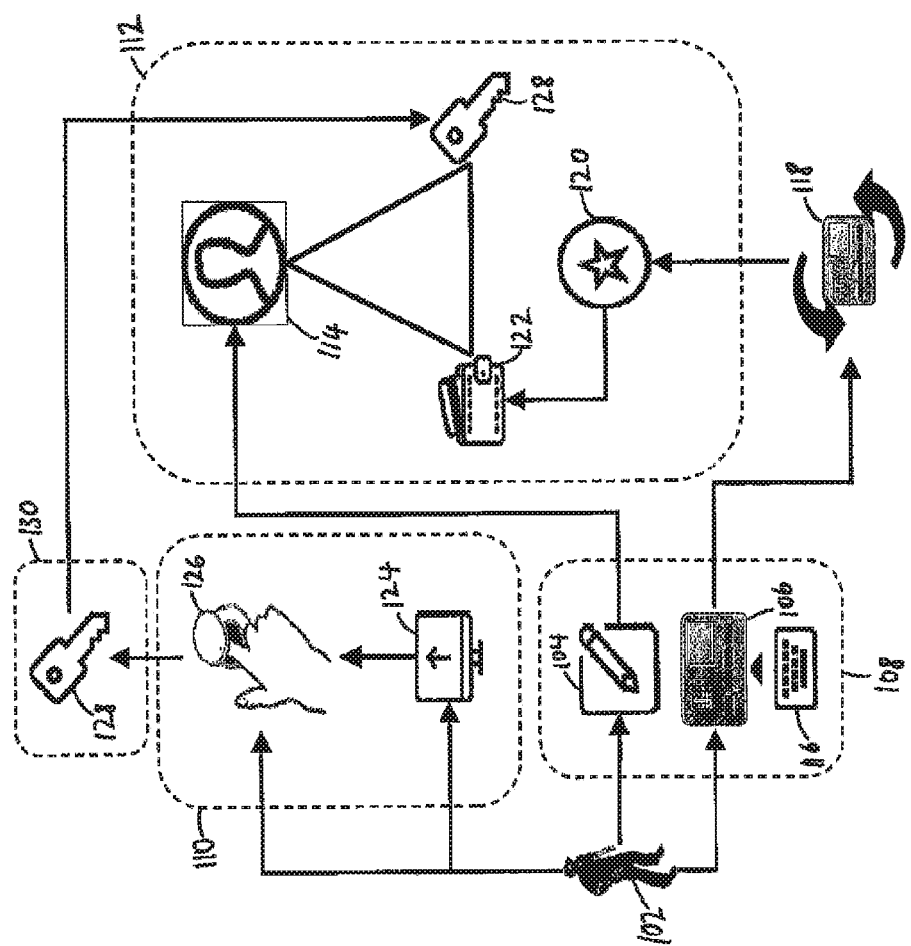
FIG. 4 is a schematic representation of a third method and system for enrolling a user onto a biometric transaction system in accordance with an embodiment of the present disclosure.

Referring to FIG. 4, another embodiment of enrollment onto the biometric transaction system involves a user 102 enroll pre-registering 104 their details and one or more payment cards 106 via a website or mobile application 108. Subsequently, the user 102 completes enrollment by registering a biometric at an enrollment station 110.

In some embodiments, registering user details 104 involves creating a user account that can be logged into using a username and password. The user account allows a user 102 to manage their personal and contact details, view their purchase history, monitor spending, manage the payment cards 106 and other assets that are associated with their biometric, receive and view electronic receipts, and receive offers and discounts.

Registering user details 104 allows the authentication application 112 to create an ACR 114 for the user 102. Registering a payment card 106 requires the user's input 116 of the payment card details, and the validation of the payment card 106 by the relevant payment card company 118. The card details can be entered manually using a keyboard, or through technology such as card.io, which obtains the card details through image processing. The website or application 108 on which the user 102 registers the payment card 106 establishes a connection to the payment card company 118 to validate the payment card. Once the payment card 106 has been validated, a PIR 120 is generated and associated with the ACR 114. The PIR 120 is held in the values wallet 122 associated with the ACR 114.

Completion of enrollment requires registration of a biometric at an enrollment station 110, which is equipped with a computing device 124, such as a POS terminal, tablet or PC, connected to a biometric input device 126. Before inputting their biometric to the biometric input device 126, the user 102 is identified at the enrollment station 110 with credentials supplied to or by the website or mobile application 108 during the pre-registration process. For example, if pre-registration involved creating a user account secured with a username and password, the user 102 presents their username and password at the enrollment station 110 to authenticate their identity. Another example requires the user 102 to establish their identity by presenting the pre-registered payment card 106. In embodiments, the user 102 also confirms the payment card 106 to be associated with their biometric for future transactions.

Once the user's identity has been confirmed, the user 102 provides their biometric to the biometric input device 124 which determines the reference biometric template 128. The reference biometric template 128 is encrypted and transmitted to the matching server 130 for storage in the database and also transmitted to the authentication application 112 for association with the ACR 114 and PIR 120 created during pre-registration. The user 102 is now enrolled and ready to use the biometric transaction system.

Figure 5:
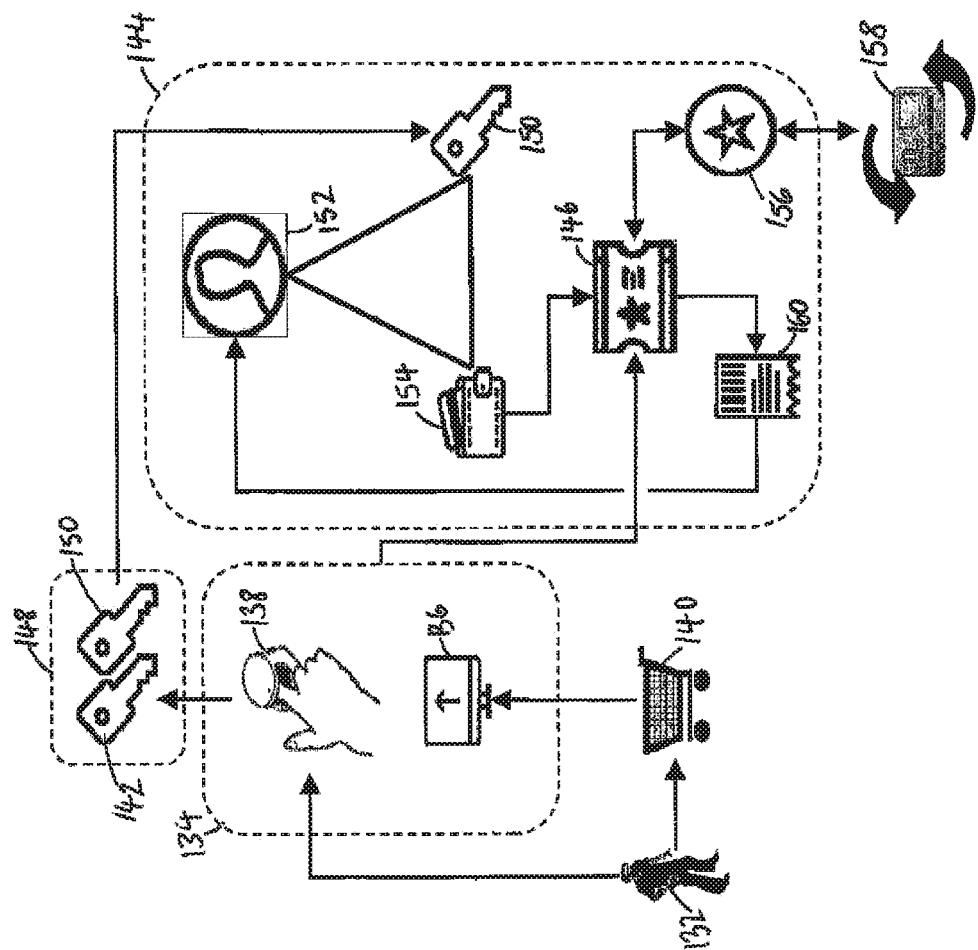
FIG. 5 is a schematic representation of a method and system for facilitating a biometric transaction system in accordance with an embodiment of the present disclosure.

Referring to FIG. 5, in embodiments, after a user 132 has enrolled onto the biometric transaction system using any of the above methods or a suitable variation, the user 132 is able to pay a vendor by authenticating transactions using only their registered biometric. Subsequently, a user's ACR is utilised to enable secure and efficient processing of the transaction. Typically, a transaction station 134 is equipped with a POS terminal 136 connected to a biometric input device 138. The user's purchase 140 is input into the POS terminal 136. The user 132 presents their biometric to the biometric input device 138 for the determination of the transaction biometric template 142.

The transaction station 134 transmits the details of the purchase 140, including at least the total amount to pay, to the authentication application 144 in order to set up a transaction 146. In one embodiment, the user 132 presents their biometric before the purchase 140 has been input into the POS terminal 136. The transaction biometric template 142 is encrypted and transmitted to the matching server 148 and compared against the reference biometric templates to find a match. Once a matching reference biometric template 150 has been found, the matching server 148 transmits the reference biometric template 150 to the authentication application 144. Thus, the binding to a stored ACR which has associated with it the various user attributes, is only done once matching of the biometric templates has already been done.

The authentication application 144 searches the ACR database and retrieves the ACR 152 that had been associated with the reference biometric template 150 at enrollment and binds the ACR 152 to the reference biometric template 150. The authentication application 144 also retrieves the associated values wallet 154 with the associated PIR 156 and binds them to the reference biometric template 150 and ACR 152.

To carry out the transaction 146, the authentication application 144 contacts the payment card company 158 and presents the PIR 156 and purchase details to request authorisation of the transaction. The card payment company 158 authorises and settles the transaction 146. In embodiments, if multiple payment cards have been registered and associated with the ACR, the user can specify which one to use for each transaction. In other words, upon insertion of a user's finger and subsequent ACR identification a choice of available registered cards is presented to a user at the POS. In other embodiments, one card is set as the default card and an option is available on the POS terminal screen for the user to change cards if desired. Completing the transaction 146 generates an electronic receipt 160 which is associated with the ACR 152 and available for the user 132 to view by logging into their biometric transaction system user account. Additionally or alternatively, the electronic receipt is emailed to the user 132 or a paper receipt is generated and given to the user 132 in-store.

Figure 6:
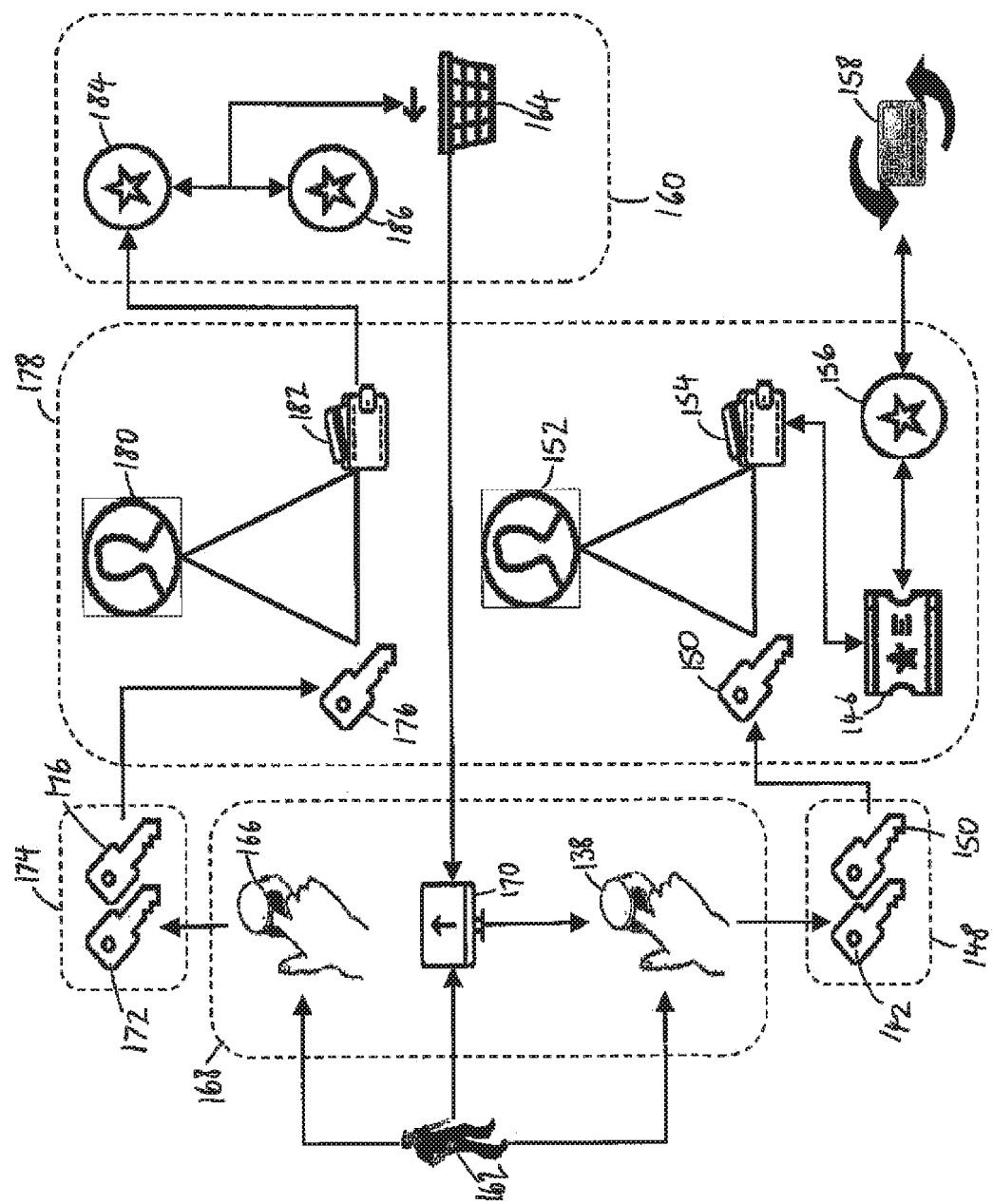
FIG. 6 is a schematic representation of a method and system for presenting a user of a biometric transaction system with personalised options at point of sale (POS) in accordance with an embodiment of the present disclosure.

Referring to FIG. 6, some embodiments of the biometric transaction system include a POS personalisation system 160 that presents a user 162 with personalised options 163 before the user 162 carries out a transaction 146. Personalised options 164 include offers and discounts specifically tailored to the user 162 and transaction history. The user 162 provides their biometric to the biometric input device 166 in order to check in at the transaction station 168 and determine a check-in biometric template 172. The check-in biometric template 172 is encrypted and transmitted to the matching server 174 and compared against the reference biometric templates to find a match.

Once a matching reference biometric template 176 has been found, the matching server 174 transmits the reference biometric template 176 to the authentication application 178. The reference biometric template 176 is then bound to the previously associated ACR 180 and values wallet 182, including a PIR 184. To generate personalised options 164, the authentication application 178 transmits the PIR 184 to the POS personalisation system 160 whereupon the PIR 184 is compared against previously stored PIRs in order to find a match. Once a matching PIR 186 is found, the personalised options 164 associated with the matching PIR 186 are transmitted to the transaction station 168 for display to the user 162 at the POS terminal 170.

The user 162 selects one or more of the personalised choices 164 to use in the upcoming transaction 146. For example, the user's selection may be a discount on their most bought item, which they plan to buy in the upcoming transaction 146. The user then uses the POS terminal to select or scan all items to purchase in the transaction 146. In another example, the user's selection may be to purchase the same items that they purchased in their most recent transaction. This results in less time spent at the POS terminal 170 as all items are then automatically added to the transaction 146 and therefore can increase total throughput of customers. The user 162 then proceeds to complete the transaction 146 as described above in reference to FIG. 5. After the completion of a transaction 146, the authentication application 178 transmits the transaction details and user's preferences to the POS personalisation system 160 for storage in association with the PIR 186. The POS personalisation system 160 builds up such stored data in order to personalise the options available to the user 162.

A system and method is provided that enables secure, fast and efficient execution of transactions using biometric templates and matching with anonymous client references (ACR), which have one or more associated user attributes. Furthermore the use of segmentation in the matching process can significantly reduce the time taken to achieve a match between a user and a stored user biometric template.

A new system as a whole is provided in that upon enrollment or subsequent engagement with the system, an ACR which is by definition anonymous, is used to enable authentication and transactions to be completed. As seen in, for example, any of the figures but in particular FIG. 1, an ACR database 26 is provided ensures that the system as a whole may be embodied as a new physical combination of hardware.

Exemplary embodiments of the present disclosure have been described above with reference to particular drawings. However, it will be appreciated that variations and modifications may be made to the examples described herein and that the scope of the invention will be defined by the claims that follow and that the claims are not limited to these exemplary embodiments.

The invention claimed is:

1. A system, comprising:
a computer configured to execute an application program included an authentication application, wherein the application program, when executed, is configured to:
  receive a user attribute;
  using the authentication application, create an anonymous client reference (ACR) associated with the user attribute;
  receive a biometric template from a source remote to the authentication application, wherein the biometric template has been determined from an input of a biometric; and
  create an association between the biometric template and the newly-created ACR, binding the associated biometric template and ACR, such that on dependence on the bound ACR and biometric template, subsequent single-factor authentication is enabled;
wherein the application program creates the association between the biometric template and the ACR without requiring a direct link between the user attribute and the biometric template.

2. A system, comprising:
a computer configured to execute an application program including an authentication application, wherein the application program, when executed, is configured to:
  receive a biometric template from a source remote to the authentication application, wherein the biometric template has been determined from an input of a biometric;
  retrieve an anonymous client reference (ACR) that is newly-created upon enrollment by the authentication application, wherein the ACR is associated with the biometric template, and wherein the ACR is associated with a user attribute; and
  bind the biometric template to the ACR, thereby enabling association between the biometric template and the ACR without requiring a direct link between the user attribute and the biometric template.

3. The system of claim 1, wherein the application program is further configured to communicate with a payment card company.

4. The system of claim 3, wherein the application program is further configured to receive a tokenised representation of a payment card from the payment card company.

5. The system of claim 4, wherein the application program is further configured to create an association between the biometric template and the tokenised representation of a payment card and bind the biometric template to the tokenised representation of a payment card.

6. The system of claim 1, wherein the application program is further configured to create an association between the biometric template and a tokenised asset and bind the biometric template to the tokenised asset.

7. The system of claim 1, further comprising a server configured to receive the biometric template and transmit the biometric template to the application program, wherein, after receiving the biometric template, the server is configured to compare the biometric template against previously stored biometric templates in the database in order to find a match.

8. The system of claim 7, wherein the database is divided into subsets of previously stored biometric templates according to location of biometric template determination.

9. The system of claim 7, further comprising a biometric input device configured to determine the biometric template and transmit the biometric template to the server, wherein the biometric input device is a finger vein reader.

10. The system of claim 1, wherein the application program is a cloud-based application.

11. A system, comprising:
 a biometric input device configured to determine a first biometric template from a first biometric input;
 a server comprising a database and RAM, wherein the server is configured to receive the first biometric template from the biometric input device and the database is configured to store the first biometric template; and
 an application program, including an authentication application, configured to receive a user attribute and a tokenised asset:
  newly create, using the authentication application, an anonymous client reference (ACR) associated with the user attribute;
  receive, from a source remote to the authentication application, the first biometric template from the server, and
  create associations between all of the first biometric template, the newly-created ACR, and the tokenised asset, thereby enabling subsequent single-factor authentication in dependence on the association between the biometric template and the ACR and/or the tokenised asset,
  wherein the application program is further configured to bind the first biometric template, the ACR, and the tokenised asset to each other, enabling the single-factor authentication without requiring a direct link between the user attribute and the biometric template.

12. The system of claim 11, wherein the biometric input device is a finger vein reader and wherein the biometric is a vascular pattern in a finger.

13. The system of claim 11, wherein the database is divided into subsets of previously stored biometric templates according to location of biometric template determination.

14. A method, comprising:
 using an authentication application, newly creating an anonymous client reference (ACR) for a user and associating the ACR with a received user attribute;
 receiving, from a source remote from the authentication application, a biometric template, wherein the biometric template has been determined from an input of a biometric from the user to a biometric input device;
 associating the biometric template with the newly-created ACR; and
 storing the biometric template and ACR in separate databases, thereby enabling single-factor authentication by allowing the retrieval of the ACR by provision of the associated biometric template without requiring a direct link between the user attribute and the biometric template.

15. The method of claim 14, further comprising:
 requesting a tokenised representation of a payment card from a payment card company;
 receiving the tokenised representation of the payment card from the payment card company; and
 creating associations between the tokenised representation of the payment card, the ACR and the biometric template.

16. The method of claim 14, further comprising:
 receiving a user attribute; and
 associating the user attribute with the ACR;
 wherein the user attribute is any of: date of birth, organisation membership, scheme membership, voucher, ticket, loyalty card.

17. A method, comprising:
 receiving a biometric template from a source, wherein the biometric template has been determined from an input of a biometric from a user to a biometric input device; and
 binding the biometric template to an associated anonymous client reference (ACR), wherein the ACR is newly created upon enrollment by an authentication application remote from the source of the received biometric template, and wherein the ACR is associated with a user attribute, thereby allowing the user to access the attribute and thereby enabling single-factor authentication without requiring a direct link between the user attribute and the biometric template.

18. The method of claim 17, further comprising:
 receiving a tokenised asset; and
 associating the tokenised asset with the ACR;
 wherein the tokenised asset is any of: a ticket, a voucher, a pass, and an identity card.

19. The method of claim 17, wherein receiving a biometric template comprises a server receiving the biometric template transmitted by a biometric input device and wherein the biometric input device is a finger vein reader.

20. The system of claim 1, wherein the application program is further configured to communicate with a holder of a payment account or provider of a payment scheme.

21. The method of claim 14, further comprising:
 requesting a tokenised representation of a payment account from a holder of the account;
 receiving the tokenised representation of the payment account from the holder; and
 creating associations between the tokenised representation of the payment account, the ACR and the biometric template.

* * * * *